United States Patent
Kleinehagenbrock et al.

(10) Patent No.: US 11,242,061 B2
(45) Date of Patent: Feb. 8, 2022

(54) VEHICLE CONTROL DEVICE, VEHICLE CONTROL METHOD AND VEHICLE CONTROL PROGRAM

(71) Applicant: Honda Motor Co., Ltd., Tokyo (JP)

(72) Inventors: Marcus Kleinehagenbrock, Offenbach am Main (DE); Thomas Weisswange, Offenbach am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 279 days.

(21) Appl. No.: 16/678,511

(22) Filed: Nov. 8, 2019

(65) Prior Publication Data

US 2020/0148211 A1   May 14, 2020

(30) Foreign Application Priority Data

Nov. 14, 2018 (DE) ...................... 10 2018 219 391.6

(51) Int. Cl.
   *B60W 30/18* (2012.01)
   *B60W 40/105* (2012.01)
   *H04W 4/46* (2018.01)

(52) U.S. Cl.
   CPC .... *B60W 30/18163* (2013.01); *B60W 40/105* (2013.01); *H04W 4/46* (2018.02); *B60W 2554/80* (2020.02); *B60W 2556/65* (2020.02)

(58) Field of Classification Search
   CPC ............................................. B60W 30/18163
   See application file for complete search history.

(56) References Cited

U.S. PATENT DOCUMENTS 9,576,483 B2 * 2/2017 Maass ................... B60W 50/14
2015/0194055 A1 * 7/2015 Maass .............. G08G 1/096716
   340/905

(Continued)

FOREIGN PATENT DOCUMENTS

DE   10 2005 023 185 A1   11/2006
DE   10 2007 033 887 A1    9/2008

(Continued)

OTHER PUBLICATIONS

Search Report dated May 22, 2019, issued in counterpart German Patent Application No. 10 2018 219 391.6 (10 pages).

*Primary Examiner* — Alex C Dunn
(74) *Attorney, Agent, or Firm* — Westerman, Hattori, Daniels & Adrian, LLP

(57) ABSTRACT

The invention relates to a vehicle control device adapted to be mounted in a host vehicle (H), the vehicle control device comprising an environment monitoring unit adapted and configured to monitor the environment of the host vehicle (H) and to provide corresponding environment monitoring data, and a lane change request generating unit adapted and configured to determine based upon the environment monitoring data whether the generation of a request for a lane change of the host vehicle (H) from a current lane (CL) to a lower-ranking lane (RL) is to be initiated (arrow A6a) or is to be suppressed (arrow A6b), if the environment monitoring data indicate that at least one succeeding vehicle (S) driving in the same lane as the host vehicle (H) approaches the host vehicle from behind at a speed higher than the speed of the host vehicle (H).

20 Claims, 10 Drawing Sheets

(56) References Cited

U.S. PATENT DOCUMENTS

| | | | | |
|---|---|---|---|---|
| 2016/0200321 A1* | 7/2016 | Yamada | ................ | G05D 1/021 |
| | | | | 701/96 |
| 2018/0032082 A1* | 2/2018 | Shalev-Shwartz | ..... | G06N 7/005 |
| 2018/0201271 A1 | 7/2018 | Ishioka et al. | | |
| 2018/0304889 A1* | 10/2018 | Shalev-Shwartz | ..... | G06N 5/046 |
| 2018/0307239 A1* | 10/2018 | Shalev-Shwartz | .......................... | |
| | | | | G01C 21/3453 |
| 2018/0307240 A1* | 10/2018 | Shalev-Shwartz | .......................... | |
| | | | | B60W 30/18163 |
| 2018/0314266 A1* | 11/2018 | Shalev-Shwartz | ..... | G06N 20/00 |
| 2019/0047571 A1 | 2/2019 | Ulbrich et al. | | |

FOREIGN PATENT DOCUMENTS

| | | | | |
|---|---|---|---|---|
| DE | 10 2015 217 498 A1 | 3/2017 | | |
| DE | 11 2016 003 156 T5 | 5/2018 | | |
| JP | 2006264635 A * | 10/2006 | | |
| JP | 4100406 B2 * | 6/2008 | | |
| JP | 6238017 B2 * | 11/2017 | | |
| JP | 6414221 B2 * | 10/2018 | ............. | G08G 1/16 |
| JP | 2020523660 A * | 8/2020 | | |
| WO | WO-2011155043 A1 * | 12/2011 | ............. | G08G 1/165 |

\* cited by examiner

VEHICLE CONTROL DEVICE, VEHICLE CONTROL METHOD AND VEHICLE CONTROL PROGRAM

The invention relates to a vehicle control device adapted to be mounted in a host vehicle, the vehicle control device comprising an environment monitoring unit adapted and configured to monitor the environment of the host vehicle and to provide corresponding environment monitoring data, and a lane change request generating unit.

Vehicle control devices of this type are used, for example, in automated driving systems, operating e.g. according to SAE level 3. They enable the host vehicle to autonomously perform lane changes when traveling on roads having a plurality of lanes at least for the traveling direction of the host vehicle. However, prior art automated driving system tend to perform lane changes too frequently, in particular lane changes to a lower-ranking lane, in order to follow a legal rule effective in many countries, namely the legal rule to keep to the lowest-ranking lane, if possible. These frequent lane changes occur especially in light traffic where the host vehicle has to frequently overtake slower vehicles.

Frequent lane changes, however, do not only tend to make the person sitting in the driver's seat of the host vehicle and possibly other passengers of the host vehicle feel uneasy, but also increase the risk of collisions with other vehicles.

In view of the above, it is the object of the present invention to provide a more efficiently operating vehicle control device.

This object is solved by a vehicle control device adapted to be mounted in a host vehicle, the vehicle control device comprising an environment monitoring unit adapted and configured to monitor the environment of the host vehicle and to provide corresponding environment monitoring data, and a lane change request generating unit adapted and configured to determine based upon the environment monitoring data whether the generation of a request for a lane change of the host vehicle from said current lane to said lower-ranking lane is to be suppressed, if the environment monitoring data indicate that there is a preceding vehicle traveling in a lower-ranking lane ahead of the host vehicle at a speed lower than the speed of the host vehicle and/or whether the generation of a request for a lane change of the host vehicle from a current lane to a lower-ranking lane is to be initiated or is to be suppressed, if the environment monitoring data indicate that at least one succeeding vehicle traveling in the same lane as the host vehicle approaches the host vehicle from behind at a speed higher than the speed of the host vehicle.

It should be noted that, according to both alternatives of the present invention, the suppression of a lane change will only be taken into consideration if there is another vehicle in the lower-ranking lane within a predetermined distance ahead of the host vehicle. If the lower-ranking lane is free within said predetermined distance, a lane change will always be initiated or accepted.

Furthermore, in order to be able to take situations into account, in which the speed of the succeeding vehicle was influenced by the host vehicle, e.g. because the host vehicle was not able to change to the lower-ranking lane quick enough, the relevant speed of the succeeding vehicle may be defined to be the highest speed of the succeeding vehicle found in the monitoring history of said succeeding vehicle.

According to one embodiment, the lane change request generating unit may be adapted and configured to suppress the generation of a lane change request, if the environment monitoring data indicate that a speed difference between the succeeding vehicle and the host vehicle is lower than a predetermined speed difference, e.g. 5 km/h. In this case, the lane change request generating unit concludes that the speed of the nearest succeeding vehicle only incidentally is somewhat higher than the speed of the host vehicle, and that the driver of the nearest succeeding vehicle isn't in a hurry. Therefore, there is no need for a lane change, and the generation of a lane change request is suppressed.

In contrast, if the environment monitoring data indicate that a speed difference between the succeeding vehicle and the host vehicle is greater than or equal to a predetermined speed difference threshold value, the lane change request generating unit concludes that the driver of nearest succeeding vehicle deliberately drives faster than the host vehicle. Therefore, the lane change request generating unit generates a lane change request, if the negative impact of the lane change on the host vehicle is acceptable. Otherwise, the generation of a lane change request is suppressed. Accordingly, the lane change request generating unit may include a negative impact estimation sub-unit adapted and configured to estimate the negative impact of a lane change on the host vehicle.

In particular, the negative impact estimation sub-unit may be adapted and configured to estimate an impact time period as a parameter representing the negative impact of a lane change on the host vehicle. Said impact time period may include a basic impact time period needed by the host vehicle to change to the lower-ranking lane, let the at least one succeeding vehicle pass, and return to the current lane. However, said impact time period may further includes at least one additional impact time period corresponding to an additional negative impact resulting from a respective negative impact increasing parameter.

An example of an additional negative impact increasing parameter is the deceleration of the host vehicle needed to allow the succeeding vehicle to pass and to return to the present lane. Furthermore, the time period required to drive below the present speed of the host vehicle could be used as an additional impact time period. Another example of an additional negative impact increasing parameter is the average difference to the present speed needed to allow the succeeding vehicle to pass and to return to the present lane. From all these additional negative impact increasing parameters corresponding additional impact time periods could be calculated. At least one of these additional impact time periods could be summed up with the basic impact time period, e.g. by weighted summing.

Furthermore, the lane change request generating unit may include a negative impact threshold value setting sub-unit adapted and configured to set a negative impact threshold value, and the lane change request generating unit may be further adapted and configured to suppress the generation of a lane change request, if the negative impact estimated by the negative impact estimation sub-unit is greater than the negative impact threshold value set by the negative impact threshold value setting sub-unit.

According to the invention, the negative impact threshold value setting sub-unit may analyze the environment monitoring data and set the negative impact threshold value in dependence upon the specific traffic situation of the host vehicle. For example, the negative impact threshold value setting sub-unit may be adapted and configured to set the negative impact threshold value based on whether or not the environment monitoring data indicate that a higher-ranking lane is available and free and/or based on whether or not the environment monitoring data indicate that the nearest succeeding vehicle is flashing.

In this context, it should be noted that, if the host vehicle and the succeeding vehicle are both travelling in the highest-ranking available lane, also an actuation of the turn indicator of the succeeding vehicle on the side to a non-existing even higher-ranking lane may be interpreted as flashing.

In particular, the negative impact threshold value setting sub-unit may be adapted and configured to set the negative impact threshold value to be zero, if the higher-ranking lane is available and free and the nearest succeeding vehicle is not flashing, and/or to a very low value, if the higher-ranking lane is available and free and the nearest succeeding vehicle is flashing, and/or to a low value, if the higher-ranking lane is either not available or not free and the nearest succeeding vehicle is not flashing, and/or to a medium value, if the higher-ranking lane is either not available or not free and the nearest succeeding vehicle is flashing.

If the higher-ranking lane is available and free and the succeeding vehicle is not flashing, it is concluded that the driver of the succeeding vehicle is aware of the fact that he could easily overtake the host vehicle. Therefore, there is no necessity for a lane change, and any negative impact on the host vehicle is deemed to be unacceptable, which is indicated by a negative impact threshold value amounting to zero.

If the higher-ranking lane is available and free and the succeeding vehicle is flashing, it is concluded that the driver of the succeeding vehicle is either not aware of the fact that he could easily overtake the host vehicle or is an impolite driver. Therefore, the generation of a lane change request is only acceptable, if the negative impact of a lane change on the host vehicle is deemed to be very low. Therefore, the negative impact threshold value setting sub-unit may be adapted and configured to estimate a first time period available to the host vehicle for traveling on the lower-ranking lane at its current speed without collision with another vehicle also traveling on the lower-ranking lane, and to set the first time period as the very low negative impact threshold value.

If the higher-ranking lane is either not available or not free and the succeeding vehicle is not flashing, it is concluded that it is a question of politeness to enable the succeeding vehicle to overtake. Therefore, the generation of a lane change request is acceptable, even if there is a low negative impact of a lane change on the host vehicle. Therefore, the negative impact threshold value setting sub-unit may be adapted and configured to estimate a second time period available to the host vehicle for traveling on the lower-ranking lane at a predetermined speed without collision with another vehicle also traveling on the lower-ranking lane, said predetermined speed being the current speed minus a predetermined speed difference, and to set the second time period as the low negative impact threshold value.

If the higher-ranking lane is either not available or not free and the succeeding vehicle is flashing, it is concluded that the driver of the succeeding vehicle is in a hurry and that it is a question of politeness to enable the succeeding vehicle to overtake. Therefore, the generation of a lane change request is acceptable, even if there is a medium negative impact of a lane change on the host vehicle. As a consequence, the negative impact threshold value setting sub-unit may adapted and configured to estimate a third time period available to the host vehicle for traveling on the lower-ranking lane at a further predetermined speed without collision with another vehicle also traveling on the lower-ranking lane, said further predetermined speed being the current speed minus a further predetermined speed difference, and to set the third time period as the medium negative impact threshold value.

For example, the further predetermined speed difference may be double the predetermined speed difference. In particular, the predetermined speed difference may amount to 10 km/h, while the further predetermined speed difference may amount to 20 km/h.

In addition or as an alternative to the afore-described manner of taking further negative impact increasing parameters into account by calculating a corresponding number of additional impact time periods, such further negative impact increasing parameters could also be taken into account by suppressing the generation of a lane change request, even if the negative impact estimated by the negative impact estimation sub-unit is lower than or equal to the negative impact threshold value set by the negative impact threshold value setting sub-unit, if the environment monitoring data indicate that a negative impact increasing parameter exceeds a negative impact increasing parameter threshold value. However, if the environment monitoring data indicate that the negative impact increasing parameter doesn't exceed the negative impact increasing parameter threshold value, a lane change request could be generated.

According to the above, the vehicle control device according to the present invention adopts the behavior of many human drivers. Human drivers tend not to change to the lower-ranking lane as long as they are not blocking faster traffic from behind. As a consequence, other drivers will not be able to recognize from the behavior of the host vehicle that the host vehicle is in an automated driving mode. Accordingly, the acceptance of vehicles operated in an automated driving mode may be increased.

It is to be emphasized that the afore-described situations may occur in both types of traffic systems, the right-hand traffic system and the left-hand traffic system. In right-hand traffic systems, e.g. in continental Europe and the United States of America, the right lane is the lowest-ranking lane, while higher-ranking lanes follow to the left, whereas in left-hand traffic systems, e.g. in Japan and the United Kingdom, the left lane is the lowest-ranking lane, while higher-ranking lanes follow to the right. For the sake of simplicity, the invention will be discussed hereinafter, in particular when referring to the drawings, with respect to a right-hand traffic system. For obtaining analogous situations for a left-hand traffic system, the situations discussed for right-hand traffic may simply be mirrored with respect to the host vehicle's traveling direction.

The invention relates to a vehicle control method and a vehicle control program.

The invention will be described in more detail with respect to a specific embodiment referring to the enclosed drawings, in which.

The concept of the present invention may be implemented in the vehicle control device known from DE 11 2016 003 156 T5. Therefore, the vehicle control device known from this document and the host vehicle to which it is mounted will be described first, referring to FIGS. 1 and 2, before discussing the concept of the present invention in detail.

Figure 1:
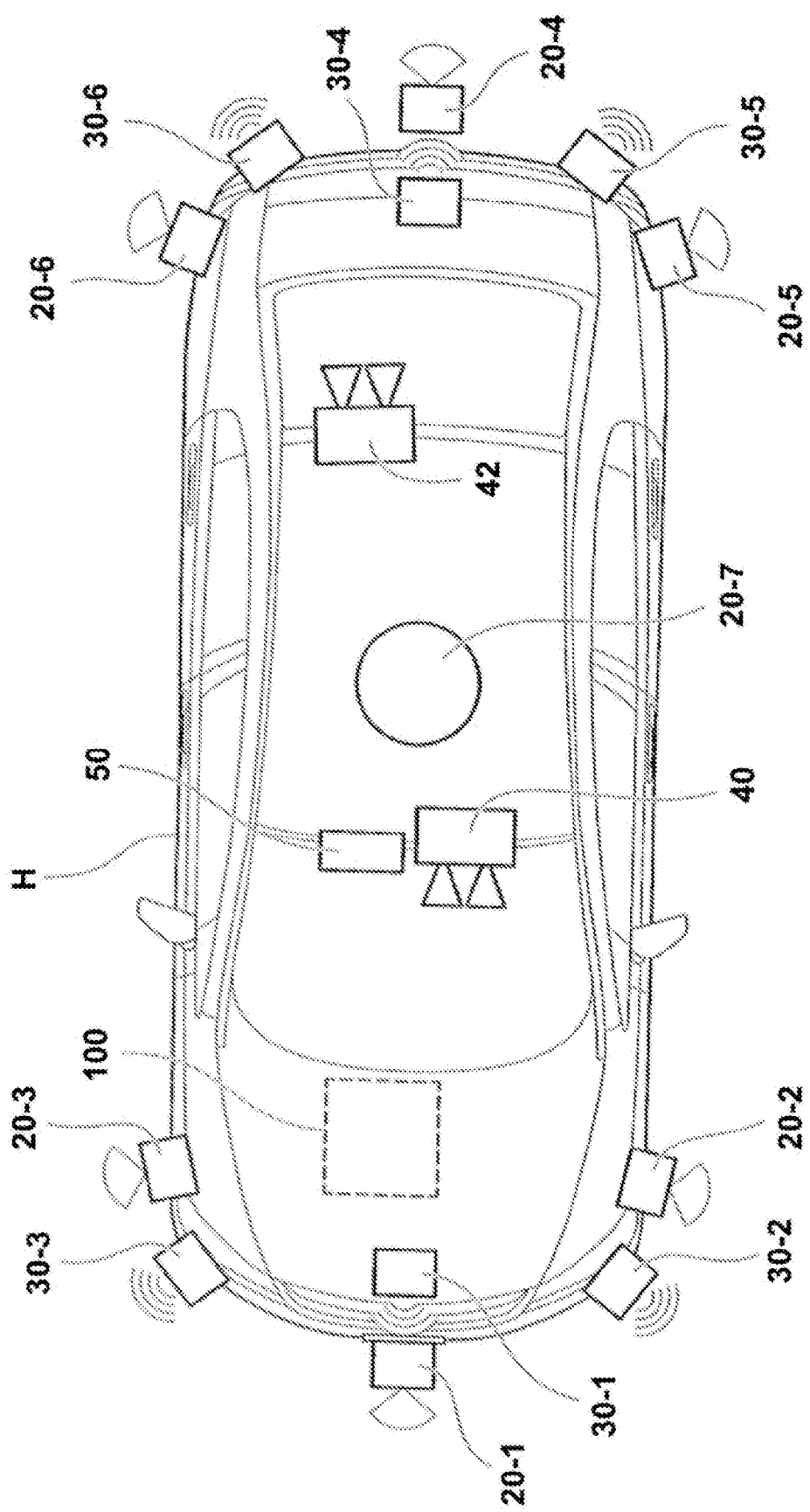
FIG. 1 shows a diagram illustrating components included in a host vehicle on which a vehicle control device may be mounted.

FIG. 1 is a diagram illustrating components included in a vehicle on which a vehicle control device 100 according to the present invention is mounted (hereinafter referred to as a host vehicle H). The vehicle on which the vehicle control device 100 is mounted is, for example, a two-wheeled vehicle, a three-wheeled vehicle, or a four-wheeled vehicle, and includes a vehicle using an internal combustion engine such as a diesel engine or a gasoline engine as a power source, an electric vehicle using an electric motor as a power source, a hybrid vehicle with an internal combustion engine and an electric motor, and the like. Further, the above-described electric vehicle is driven using electric power that is discharged by a battery such as a secondary battery, a hydrogen fuel cell, a metal fuel cell, or an alcohol fuel cell, for example.

As illustrated in FIG. 1, sensors such as finders 20-1 to 20-7, radars 30-1 to 30-6, cameras 40 and 42, a navigation device 50, and a vehicle control device 100 described above are mounted on the vehicle. Although not shown in detail, the vehicle control device 100 may include an electronic power steering control unit, a human/machine interface, a vehicle stability assist control unit, in particular for assisting braking of the vehicle H, and a C2X communication unit.

The finders 20-1 to 20-7 are, for example, light detection and ranging or laser imaging detection and ranging units (LIDAR units) that measure scattered light with respect to irradiation light and measures a distance to a target. For example, the finder 20-1 is attached to a front grill or the like, and the finders 20-2 and 20-3 are attached to a side surface of a vehicle body, a door mirror, the inside of a headlight, the vicinity of side lamps, and the like. The finder 20-4 is attached to a rear bumper, a trunk lid or the like, and the finders 20-5 and 20-6 are attached to the side surface of the vehicle body, the inside of a taillight, or the like. For example, the finders 20-1 to 20-6 described above have a detection range of about 150° with respect to a horizontal direction. Further, the finder 20-7 is attached to a roof of the vehicle or the like. For example, the finder 20-7 has a detection range of 360° with respect to the horizontal direction. Hereinafter, the finders 20-1 to 20-7 are simply referred to as a "finder 20" when not indicated differently.

The radars 30-1 and 30-4 described above are, for example, long-distance millimeter-wave radars of which the detection range in a depth direction is larger than that of other radars. Further, the radars 30-2, 30-3, 30-5, and 30-6 are intermediate-distance millimeter wave radars of which the detection range in the depth direction is shorter than that of the radars 30-1 and 30-4. Hereinafter, the radars 30-1 to 30-6 are simply referred to as a "radar 30" when not indicated differently. The radar 30 detects an object using, for example, a frequency modulated continuous wave (FM-CW) scheme.

Cameras 40 and 42 are, for example, digital dual-lens cameras using a solid-state imaging device such as a charge coupled device (CCD) or a complementary metal oxide semiconductor (CMOS). While the camera 40 is attached to an upper portion of a front windshield, a rear surface of a rearview mirror, or the like, the camera 42 may be attached to an upper portion of a rear window of the vehicle H. For example, the cameras 40 and 42 periodically repeatedly take images in the front and in the back of the host vehicle H, respectively.

The configuration illustrated in FIG. 1 is merely an example, and part of the configuration may be omitted or another configuration may be added.

It is to be noted that the vehicle control device according to the present invention merely needs a sub-set of these sensors, for example, finders 20-1 and 20-4, radars 30-1 and 30-4, and cameras 40 and 42. However, it is also conceivable that the vehicle control device according to the present invention makes use of all sensors discussed with respect to FIG. 1 and possibly further sensors.

Figure 2:
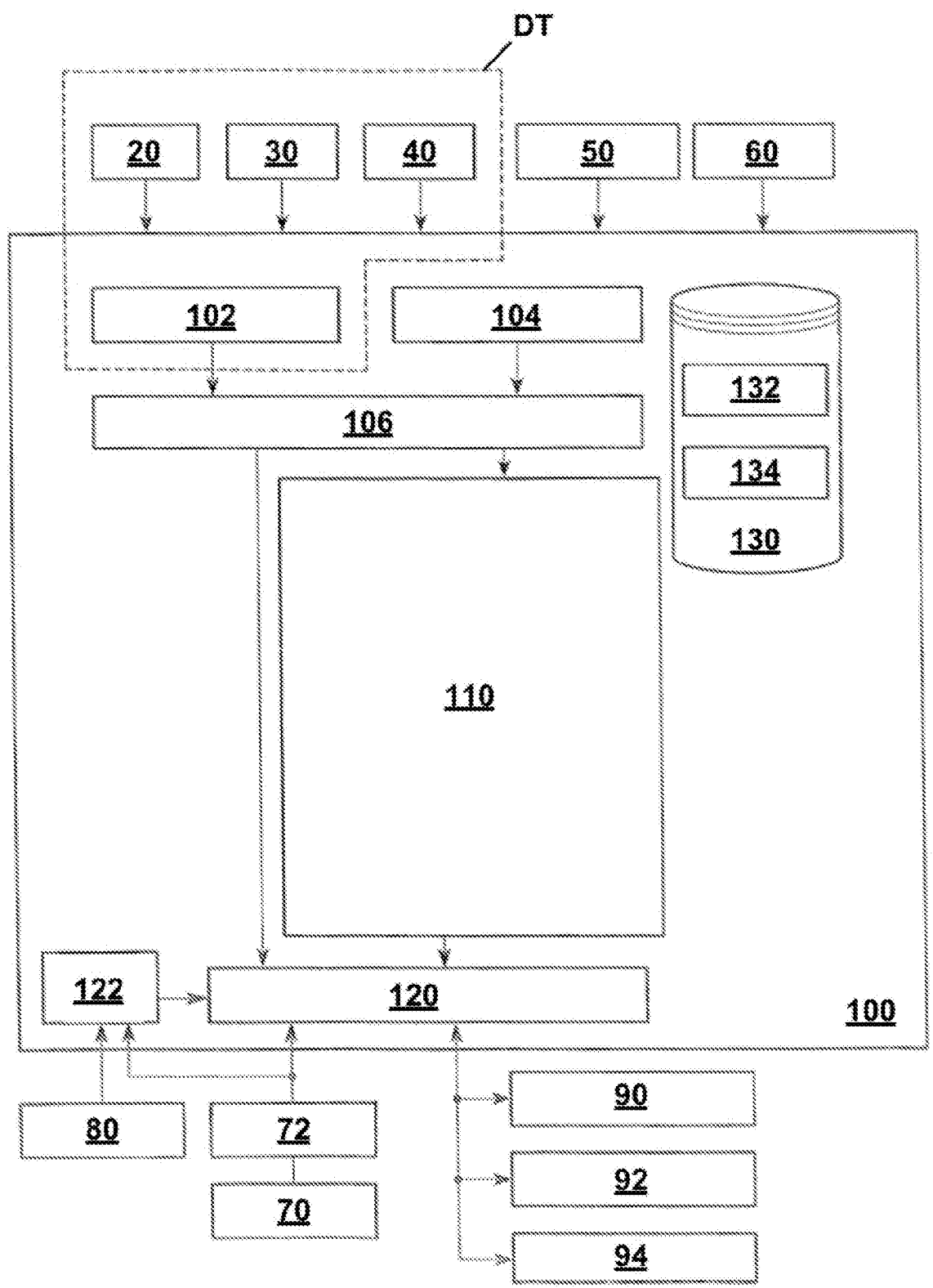
FIG. 2 shows a functional configuration diagram of the host vehicle of FIG. 1 including the vehicle control device according to the present invention.

FIG. 2 is a functional configuration diagram of the host vehicle H including the vehicle control device 100. A navigation device 50, a vehicle sensor 60, an operation device 70, an operation detection sensor 72, a changeover switch 80, a travel driving force output device 90, a steering device 92, a brake device 94, and the vehicle control device 100 are mounted on the host vehicle H, in addition to the finder 20, the radar 30, and the cameras 40, 42.

The navigation device 50 includes a global navigation satellite system (GNSS) receiver or map information (navigation map), a touch panel type display device functioning as a user interface, a speaker, a microphone, and the like. The navigation device 50 specifies a position of the host vehicle H using the GNSS receiver and derives a route from the position to a destination designated by the user. The route derived by the navigation device 50 is stored as route information 134 in a storage unit 130, in which also map information for the navigation device 50 is stored. The position of the host vehicle H may be identified or supplemented by an inertial navigation system (INS) using the output of the vehicle sensor 60. Further, when the vehicle control device 100 is executing a manual driving mode, the navigation device 50 performs guidance through voice or a navigation display for the route to the destination. A configuration for specifying the position of the host vehicle H may be provided independently of the navigation device 50. Further, the navigation device 50 may be realized, for example, by a function of a terminal device such as a smartphone or a tablet terminal possessed by the user. In this case, transmission and reception of information is performed between the terminal device and the vehicle control device 100 through wireless or wired communication.

The vehicle sensor 60 includes a vehicle speed sensor that detects a speed of the host vehicle H (vehicle speed), an acceleration sensor that detects an acceleration, a yaw rate sensor that detects an angular velocity around a vertical axis, and a direction sensor that detects a direction of the host vehicle H.

The operation device 70 includes, for example, an accelerator pedal, a steering wheel, a brake pedal, a shift lever, and the like. The operation detection sensor 72 that detects the presence or absence or the amount of an operation of the driver is attached to the operation device 70. The operation detection sensor 72 includes, for example, an accelerator opening degree sensor, a steering torque sensor, a brake sensor, a shift position sensor, and the like. The operation detection sensor 72 outputs a degree of accelerator opening, a steering torque, a brake pedal amount, a shift position, and the like as detection results to the travel control unit 120. Alternatively, the detection result of the operation detection sensor 72 may be directly output to the travel driving force output device 90, the steering device 92, or the brake device 94.

The changeover switch 80 is a switch that is operated by a driver or the like. The changeover switch 80 may be a mechanical switch or may be a graphical user interface (GUI) switch that is provided in the touch panel type display device of the navigation device 50. The changeover switch 80 receives a switching instruction to switch between a manual driving mode in which the driver manually drives and an automated driving mode in which the vehicle travels in a state in which the driver does not perform operations (or the amount of an operation is smaller than in the manual driving mode or an operation frequency is lower than that in the manual driving mode), and generates a control mode designation signal for designating a control mode of the travel control unit 120 as any one of the automated driving mode and the manual driving mode.

The travel driving force output device 90 includes, for example, one or both of an engine and an electric motor. When the travel driving force output device 90 includes only an engine, the travel driving force output device 90 further includes an engine electronic control unit (ECU) that controls the engine. The engine ECU controls the travel driving force (torque) for causing the vehicle to travel, for example, by adjusting a degree of throttle opening, a shift stage, or the like according to information input from the travel control unit 120. When the travel driving force output device 90 includes only a traveling motor, the travel driving force output device 90 includes a motor ECU that drives the traveling motor. The motor ECU controls the travel driving force for causing the vehicle to travel, for example, by adjusting a duty ratio of a PWM signal (pulse width modulation signal) to be applied to the electric motor. When the travel driving force output device 90 includes both an engine and an electric motor, both an engine ECU and a motor ECU cooperate to control the travel driving force.

The steering device 92 includes, for example, an electric motor that can change directions of steered wheels by applying a force on a rack and pinion arrangement or the like, a steering angle sensor that detects a steering angle (or actual steering angle), and the like. The steering device 92 drives the electric motor according to information input from the travel control unit 120.

The brake device 94 includes a master cylinder to which a brake operation of the brake pedal is transmitted as hydraulic pressure, a reservoir tank that stores brake fluid, a brake actuator that adjusts a braking force that is output to each wheel, and the like. The brake device 94 controls the brake actuator or the like so that a brake torque having a desired magnitude is output to each wheel according to information input from the travel control unit 120. The brake device 94 is not limited to an electronic control brake device that is operated by the above-described hydraulic pressure, and may be an electronic control brake device that is operated by an electric actuator.

Hereinafter, the vehicle control device 100 will be described in more detail.

The vehicle control device 100 includes, for example, an outside world recognition unit 102, a host-vehicle position recognition unit 104, an action plan generation unit 106, a lane change control unit 110, a travel control unit 120, a control switching unit 122, and a storage unit 130. Some or all of the outside world recognition unit 102, the host-vehicle position recognition unit 104, the action plan generation unit 106, the lane change control unit 110, the travel control unit 120, and the control switching unit 122 may be software functional units that function by a processor such as a central processing unit (CPU) executing a program. Further, some or all of these may be hardware functional units such as large scale integration (LSI) or application specific integrated circuit (ASIC). Further, the storage unit 130 is realized by a read only memory (ROM), a random access memory (RAM), a hard disk drive (HDD), a flash memory, or the like. The program may be stored in the storage unit 130 in advance or may be downloaded from an external device via an in-vehicle internet facility or the like. Further, a portable storage medium having the program stored thereon may be installed in the storage unit 130 by being mounted on a drive device (not illustrated).

The outside world recognition unit 102 recognizes a state such as a position and a speed of at least one nearby vehicle on the basis of outputs of the finder 20, the radar 30, cameras 40, 42, and the like. The at least one nearby vehicle in this embodiment is a vehicle that travels around the host vehicle H and is a vehicle that travels in the same direction as the host vehicle H. The at least one nearby vehicle may include at least one preceding vehicle, at least one succeeding vehicle, at least one vehicle traveling in the same lane as the host vehicle H, at least one vehicle traveling in a lower-ranking lane, and at least one vehicle traveling in a higher-ranking lane.

The position of the at least one nearby vehicle may be represented by a representative point such as a centroid or a corner of the at least one nearby vehicle or may be represented by an area expressed by an outline of the at least one nearby vehicle. The "state" of the at least one nearby vehicle may include an acceleration of the at least one nearby vehicle, and an indication of whether or not the at least one nearby vehicle is changing lane (or whether or not the at least one nearby vehicle is about to change lane) on the basis of the information of various devices described above. The outside world recognition unit 102 recognizes whether or not the at least one nearby vehicle is changing lane (or whether or not the nearby vehicle is about to change lane) based on the history of the position of the at least one nearby vehicle, the operation state of the direction indicator, or the like. Further, in addition to nearby vehicles, the outside world recognition unit 102 may also recognize a position of at least one guardrail, at least one utility pole, at least one parked vehicle, at least one pedestrian, and the like. Hereinafter, a combination of the finder 20, the radar 30, the camera 40, and the outside world recognition unit 102 is referred to as a "detection unit DT". The detection unit DT may further recognize a state of a position, a speed, or the like of the at least one nearby vehicle through communication with the respective nearby vehicle.

As already mentioned, the concept of the present invention may be implemented in the vehicle control device 100 known from DE 11 2016 003 156 T5. In particular, the lane change request generating unit may be implemented in the action plan generation unit 106, and the generated lane change requests may be forwarded to the lane change control unit 110 which is responsible to perform the lane change while minimizing, if not excluding, any collision risk. Moreover, the detection unit DT assumes the function of the environment monitoring unit of the present invention.

Figure 4A:
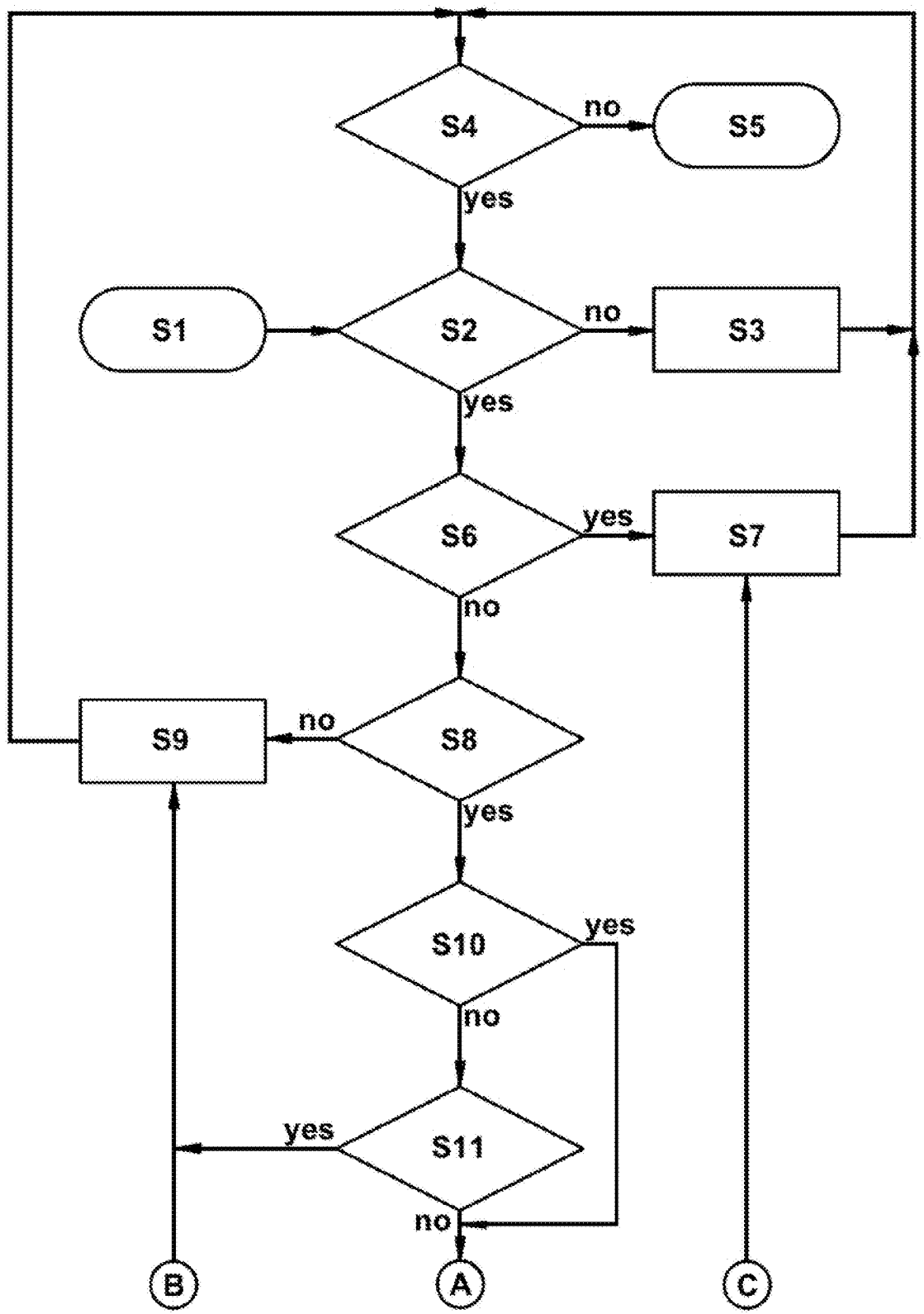
FIGS. 4a and 4b show a flow-chart illustrating the operation of the lane change request generating unit.

In the following the operation of the vehicle control system 100 according to the present invention will be described referring to FIGS. 4a and 4b.

The process starts in step S1, when the changeover switch 80 has been switched by a driver or another passenger of the host vehicle H to the automated driving mode, and the environment monitoring data indicate that the host vehicle H is traveling on a multi-lane road.

Figure 3:
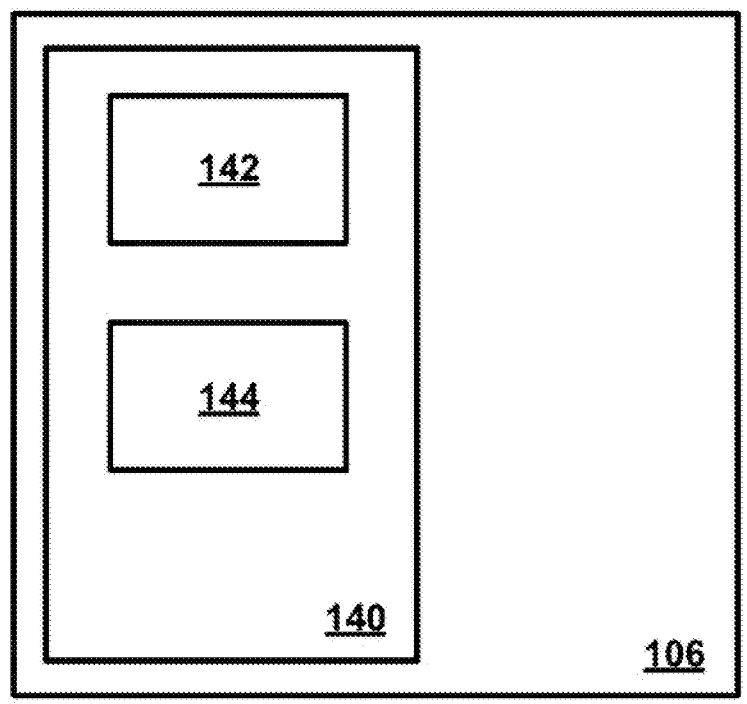
FIG. 3 shows a block diagram of the action plan generation unit including a lane change request generating unit implementing the concept of the present invention.

Then, the process proceeds to step S2, in which it is determined whether or not the current traffic situation might be suitable for being handled by the lane change request generating unit 140 according to the invention (see FIG. 3). For example, it is decided to use the prior art control and to proceed to step S3 (step S2: NO), if the traffic situation is deemed to be risky. Moreover, there is no necessity to have the current traffic situation handled by the lane change request generating unit 140, if the host vehicle H is traveling on the lowest-ranking lane or if a preceding vehicle is traveling at a lower speed than the host vehicle H, as in the latter case the host vehicle H will have to overtake the preceding vehicle. Accordingly, the process will proceed to step S3 in these cases as well.

After step S3, the process proceeds to step S4, in which it is checked whether or not the vehicle is still operating in the automated driving mode and is still traveling on a multi-lane road. In the negative case (step S4: NO), the process proceeds to step S5, in which the automated multi-lane driving mode is ended. In the affirmative case (step S4: YES), however, the process returns to step S2.

If the traffic situation is suitable for the automated multi-lane driving mode (step S2: YES), the process proceeds to step S6, in which it is determined whether or not a lower-ranking lane adjacent to the lane on which the host vehicle H is currently traveling is completely free, i.e. whether or not there are preceding vehicles traveling in the lower-ranking lane within a predetermined length interval ahead of the host vehicle H.

In the affirmative case, i.e. if there are no preceding vehicles traveling in the lower-ranking lane within the predetermined length interval ahead of the host vehicle H (step S6: YES), a lane change request is generated by the lane change request generating unit 140 and output to the prior art control system in a step S7.

After step S7, the process proceeds to afore-discussed step S4.

However, if the adjacent lower-ranking lane is not completely free (step S6: NO), the process proceeds to step S8, in which it is determined whether or not there is at least one succeeding vehicle traveling in the same lane as the host vehicle H at a speed which is higher than the speed of the host vehicle H by at least a predetermined speed difference value $\Delta v$, e.g. 10 km/h.

If there are no faster succeeding vehicles (step S8: NO), the lane change request generating unit 140 suppresses the generation of a lane change request and outputs this decision to the prior art control system in a step S9.

After step S9, the process proceeds to afore-discussed step S4.

However, if there are faster succeeding vehicles (step S8: YES), the lane change request generating unit 140 starts to operate according to the concept of the present invention starting from step S10, i.e. the lane change request generating unit 140 starts to evaluate the traffic situation as to which is negative impact a lane change will have on the host vehicle H, and as to whether or not it is justified by the overall traffic situation to accept this negative impact, in particular depending on whether or not a higher-ranking lane adjacent to the current lane of the host vehicle H is available and free for the at least one faster succeeding vehicle, and depending on whether or not the succeeding vehicle is flashing.

For the simplest of these situations, namely the situation according to which the higher-ranking lane is available and free (step S11: YES) and the succeeding vehicle is not flashing (step S10: NO), the lane change request generating unit 140 concludes that the driver of the succeeding vehicle is aware of the fact that he could easily overtake the host vehicle H. Therefore, there is no necessity for a lane change. Thus, the lane change request generating unit 140 suppresses the generation of a lane change request and outputs this decision to the prior art control system in step S9.

Otherwise (step S10: YES or step S11: NO), the process proceeds to step S12.

In step S12, the traffic situation is analyzed based on the environment monitoring data provided by the detection unit DT. First of all, the number of succeeding vehicles as well as their respective speeds and distances from the host vehicle H are determined. Secondly, the number of free gaps in the lower-ranking lane adjacent to the current lane on which the host vehicle is traveling as well as their respective positions and lengths are determined. On the basis of this information, a negative impact estimation sub-unit 142 of the lane change request generating unit 140 (see FIG. 3) estimates a negative impact by a lane change on the host vehicle as an impact time period $t_i$. The impact time period $t_i$ includes at least a basic impact time period $t_0$ which is needed for changing to the adjacent lower-ranking lane, allowing at least one succeeding vehicle to pass, and changing back to the current lane.

In addition to said basic impact time period $t_0$, said impact time period $t_i$ may further include at least one additional impact time period corresponding to an additional negative impact resulting from a respective negative impact increasing parameter. For example a deceleration impact time period $t_{decel}$ may be calculated based on the deceleration of the host vehicle needed to allow the succeeding vehicle to pass and to return to the present lane. Furthermore, the time period required to drive below the present speed of the host vehicle could be used as a low speed impact time period $t_{low\_speed}$. Moreover, a speed difference impact time period $t_{\Delta speed}$ may be calculated based on the average speed difference to the present speed needed to allow the succeeding vehicle to pass and to return to the present lane. At least one of these additional impact time periods could be summed up with the basic impact time period, e.g. by weighted summing, in order to obtain the impact time period $t_i$.

Furthermore, a negative impact threshold value setting sub-unit 144 of the lane change request generating unit 140 (see FIG. 3) determines in step S12 a first time period $t_1$ available to the host vehicle for traveling on the lower-ranking lane at its current speed without collision with another vehicle also traveling on the lower-ranking lane as a very low impact threshold value, a second time period $t_2$ available to the host vehicle for traveling on the lower-ranking lane at a predetermined speed without collision with another vehicle also traveling on the lower-ranking lane, said predetermined speed being the current speed minus a first speed difference $\Delta v_1$, as a low impact threshold value, and a third time period $t_3$ available to the host vehicle for traveling on the lower-ranking lane at a further predetermined speed without collision with another vehicle also traveling on the lower-ranking lane, said further predetermined speed being the current speed minus a second predetermined speed difference $\Delta v_2$, as a medium impact threshold value. In the following, the lane change request generating unit 140 determines based on the time periods $t_i$, $t_1$, $t_2$ and $t_3$ whether a lane change request should be generated or suppressed.

Following to the traffic situation analysis of step S12, the process proceeds to step S13, in which it is again determined whether or not the succeeding vehicle is flashing.

If this is not the case (step S13: NO), the lane change request generating unit 140 concludes that it is a question of politeness to enable the succeeding vehicle to overtake, as the higher-ranking lane is either not available or not free. Therefore, the process proceeds to step S14, in which it is determined whether or not the second time period $t_2$ is lower than or equal to the impact time period $t_i$, i.e. whether there is sufficient time for changing to the adjacent lower-ranking lane and back to the current lane, when decelerating the host vehicle by the first speed difference $\Delta v_1$.

If this is not the case (step S14: NO), the lane change request generating unit 140 suppresses the generation of a lane change request and outputs this decision to the prior art control system in step S9.

Otherwise (step S14: YES), the lane change request generating unit 140 generates a lane change request and outputs this decision to the prior art control system in step S7.

If it is determined in step S13 that the succeeding vehicle is flashing (step S13: YES), the process proceeds to step S15, in which it is again determined whether or not the higher-ranking lane is available and free.

If this is the case (step S15: YES), the lane change request generation unit 140 concludes from the flashing that the driver of the succeeding vehicle is either not aware of the fact that he could easily overtake the host vehicle or is an impolite driver. Therefore, the process proceeds to step S16, in which it is determined whether or not the first time period $t_1$ is lower than or equal to the impact time period $t_i$, i.e. whether there is sufficient time for changing to the adjacent lower-ranking lane and back to the current lane, without decelerating the host vehicle.

If this is not the case (step S16: NO), the lane change request generating unit 140 suppresses the generation of a lane change request and outputs this decision to the prior art control system in step S9.

Otherwise (step S16: YES), the lane change request generating unit 140 generates a lane change request and outputs this decision to the prior art control system in step S7.

If it is determined in step S15 that the adjacent higher-ranking lane is either not available or not free (step S15: NO), the lane change request generation unit 140 concludes from the flashing that the driver of the succeeding vehicle is in a hurry and that it is a question of politeness to enable the succeeding vehicle to overtake. Therefore, the process proceeds to step S17, in which it is determined whether or not the third time period $t_3$ is lower than or equal to the impact time period $t_i$, i.e. whether there is sufficient time for changing to the adjacent lower-ranking lane and back to the current lane, when decelerating the host vehicle by the second speed difference $\Delta v_2$.

If this is not the case (step S17: NO), the lane change request generating unit 140 suppresses the generation of a lane change request and outputs this decision to the prior art control system in step S9.

Otherwise (step S17: YES), the lane change request generating unit 140 generates a lane change request and outputs this decision to the prior art control system in step S7.

Figure 4B:
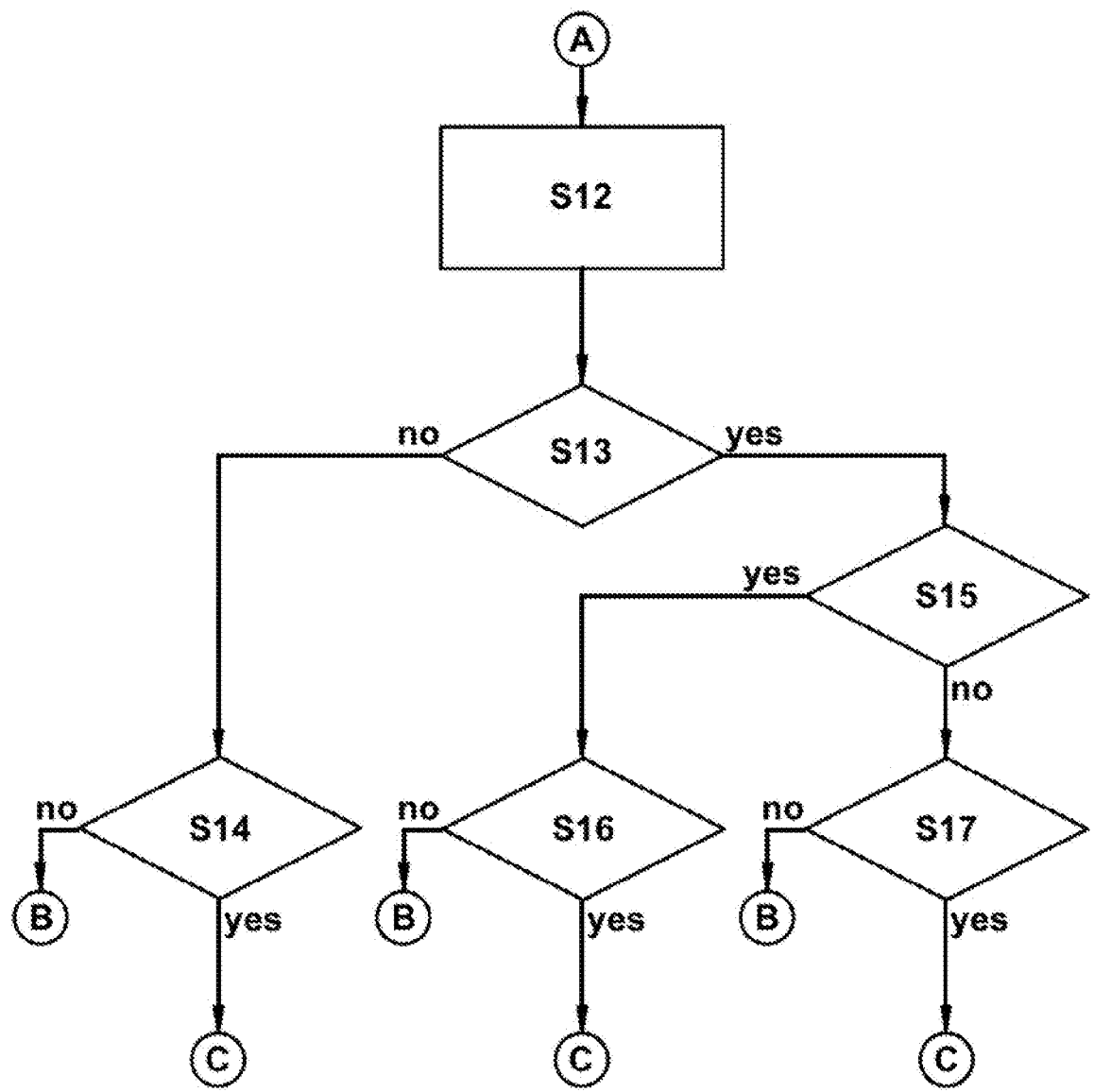

Although not illustrated in FIG. 4b, it should be understood that following to the YES-branches of steps S14, S16 and S17 additional steps could be provided, in which those negative impact increasing parameters which have not yet been taken into account when calculating the impact time period $t_i$ could now be taken into account. In such an additional step, it could, for example, be determined whether or not the give way maneuver by a lane change to and back from the adjacent lower-ranking lane may be performed without excessively decelerating the host vehicle. If this is the case, the lane change request generating unit 140 may generate a lane change request and output this decision to the prior art control system in step S7. Otherwise, the lane change request generating unit 140 may suppress the generation of a lane change request and output this decision to the prior art control system in step S9.

In the following, specific traffic situations in a right-hand traffic system and the reaction of the lane change generation unit 140 to these situations will be described referring to FIGS. 5 to 12. In this context, if a succeeding vehicle S is indicated to be a "faster" than the host vehicle H, this means that it is faster than the host vehicle to an extent that step S8 is answered by YES.

Figure 5:
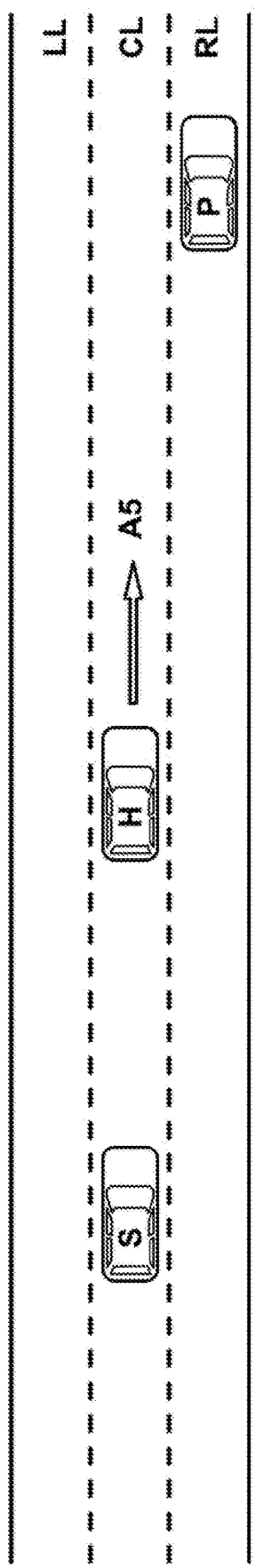
FIGS. 5 to 13 show diagrams illustrating specific traffic situations.

In the traffic situation shown in FIG. 5, the host vehicle H is traveling in the center lane CL of a three-lane highway, followed by a faster succeeding vehicle S. In some distance ahead of the host vehicle H, a preceding vehicle P is traveling in the right lane RL. As may be seen from FIG. 5, a left lane LL is available and is completely free, and the succeeding vehicle S is not flashing.

In this "step S10: NO; step S11: YES" situation, the lane change generation unit 140 will suppress the generation of a lane change request and output this decision to the prior art control system in step S9. Accordingly the host vehicle H will stay in the center lane CL, which is indicated in FIG. 5 by an arrow A5.

Figure 6:
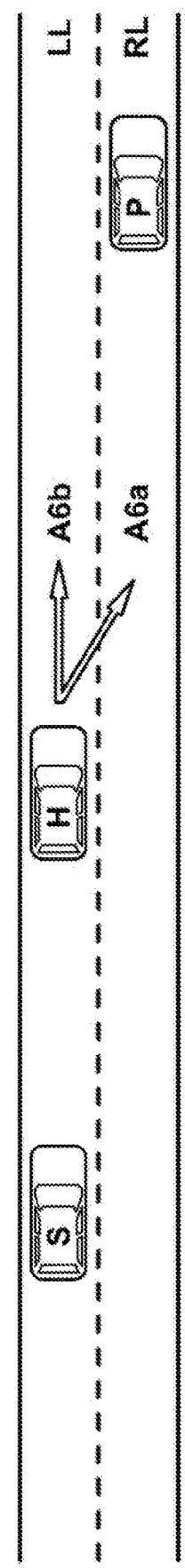

In the traffic situation shown in FIG. 6, the host vehicle H is traveling in the left lane LL of a two-lane highway, followed by a faster succeeding vehicle S. In some distance ahead of the host vehicle H, a preceding vehicle P is traveling in the right lane RL. As may be seen from FIG. 6, there is no higher-ranking lane than the left lane LL, and the succeeding vehicle S is not flashing.

In this "step S11: NO; steps S10 and S13: NO" situation, the lane change generation unit 140 will, depending on the other parameters of the traffic situation, determine in step S14 whether or not the low impact threshold time period $t_2$ is lower than or equal to the impact time period $t_0$, and will either generate a lane change request and output this decision to the prior art control system (step S14: YES→step S7), which is indicated in FIG. 6 by an arrow A6a, or suppress the generation of a lane change request and output this decision to the prior art control system (step S14: NO→step S9), which is indicated in FIG. 6 by an arrow A6b.

Figure 7:
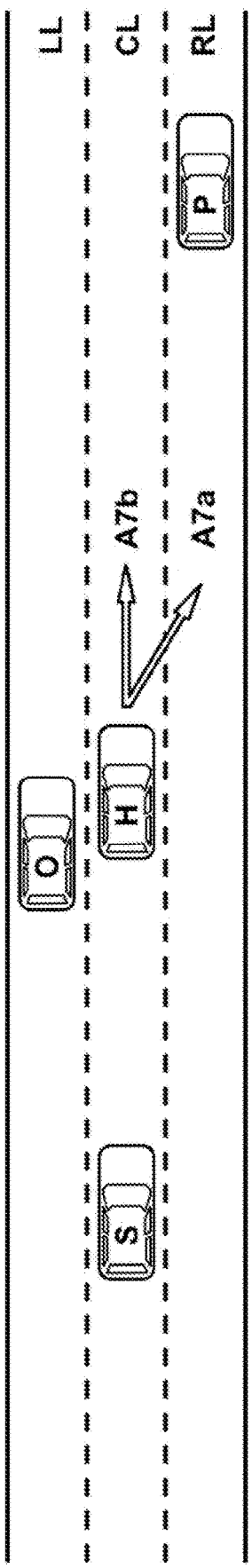

The situation shown in FIG. 7 is similar to that of FIG. 6. However, the host vehicle H is traveling in the center lane CL of a three-lane highway, a left lane LL being available, but blocked by another vehicle O. Again the succeeding vehicle S is not flashing. So, this again is a "step S11: NO; steps S10 and S13: NO" situation, and the lane change generation unit 140 will, depending on the other parameters of the traffic situation, either generate a lane change request and output this decision to the prior art control system in step S7, which is indicated in FIG. 7 by an arrow A7a, or suppress the generation of a lane change request and output this decision to the prior art control system in step S9, which is indicated in FIG. 7 by an arrow A7b.

Figure 8:
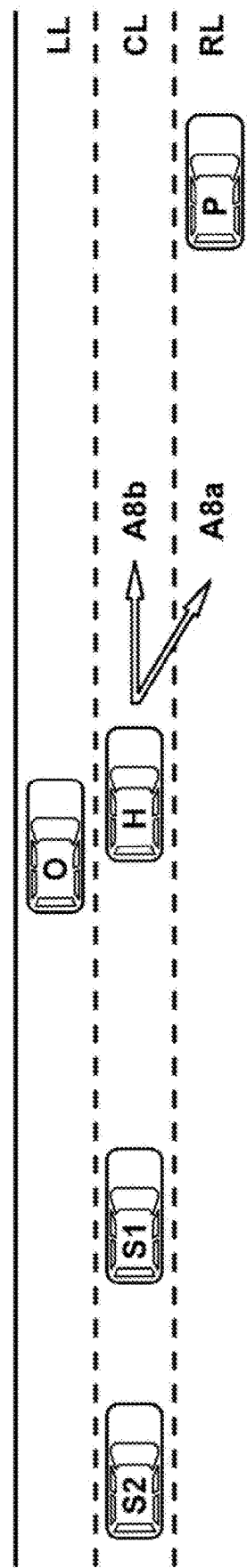

The situation shown in FIG. 8 is similar to that of FIG. 7. However, there are several succeeding vehicles S1 and S2 approaching the host vehicle H from behind. In principle, this doesn't change the "step S11: NO; steps S10 and S13: NO" situation. However, the time period $t_0$ needed for changing to the right lane RL, allowing the succeeding vehicles S1 and S2 pass and returning to the center lane CL presumably will be longer than in the case of the traffic situation of FIG. 7. Accordingly, the probability that lane change generation unit 140 will decide in favor of suppressing the generation of a lane change request (arrow A8b) is increased, while the probability that lane change generation unit 140 will decide in favor of generating a lane change request (arrow A8a) is decreased.

Figure 9:
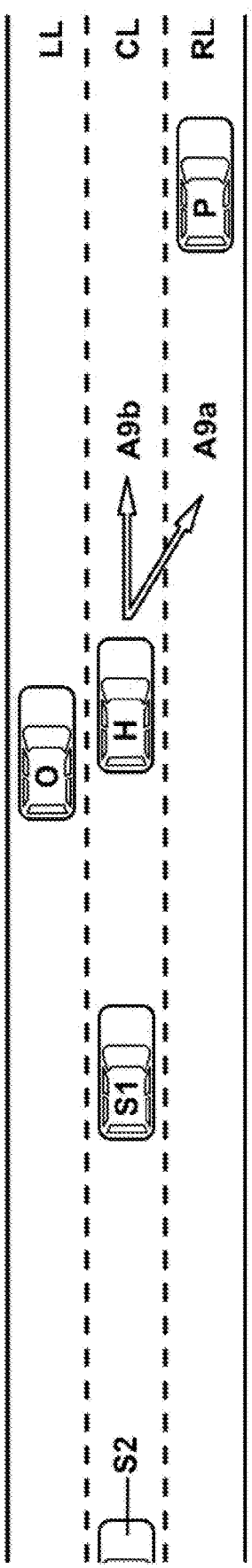

Also the situation shown in FIG. 9 is similar to that of FIG. 8. However, the succeeding vehicles S1 and S2 have a different distance from each other. In principle, this doesn't change the "step S11: NO; steps S10 and S13: NO" situation. However, the different spacing of the succeeding vehicles S1 and S2 will have influence on the time period $t_0$, as it might be conceivable to allow only succeeding vehicle S1 to pass, and to change back to the center lane CL between the succeeding vehicles S1 and S2. Accordingly, the probabilities that lane change generation unit 140 will suppress the generation of a lane change request (arrow A9b) or generate a lane change request (arrow A9a) will be different.

Figure 10:
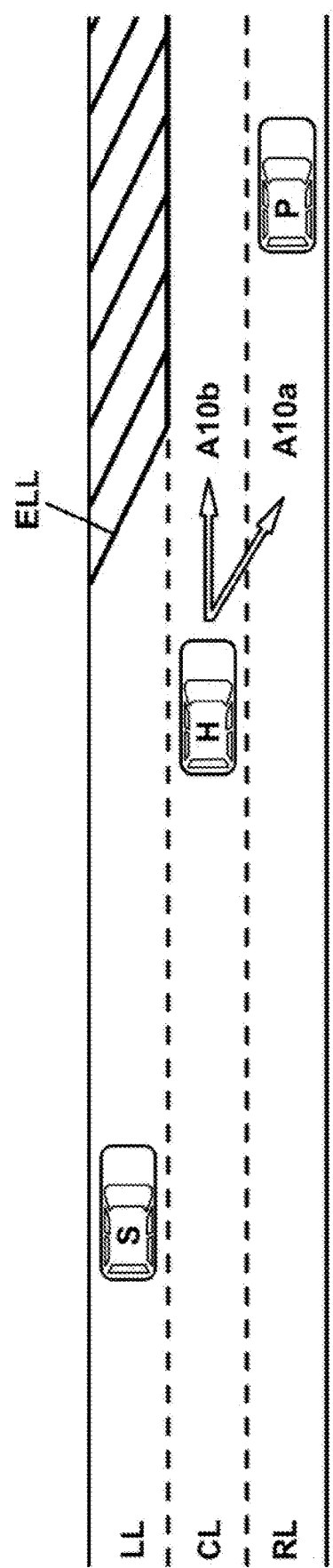

According to FIG. 10, the lane change generating unit 140 may recognize that, although the succeeding vehicle S is traveling in the left lane LL, the end ELL of the left lane LL will result in a traffic situation similar to that of FIG. 6. As a consequence, the lane change generating unit 140 will, depending on the other parameters of the traffic situation, either suppress the generation a lane change request (arrow A10b) or generate a lane change request (arrow A10a).

Figure 11:
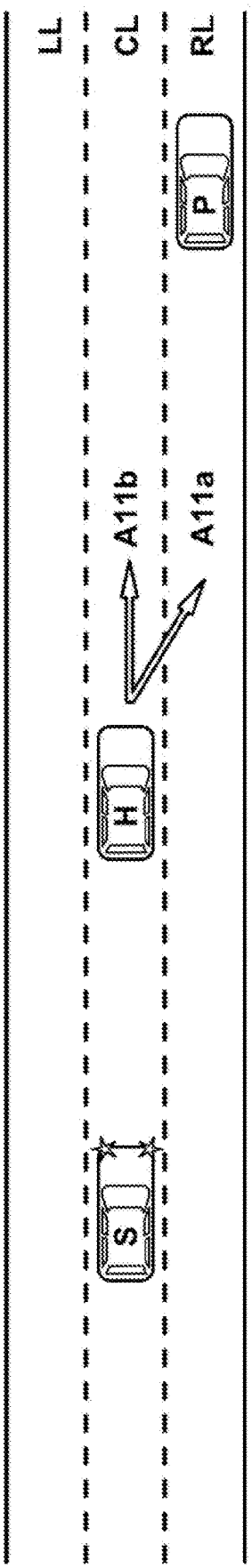

The situation shown in FIG. 11 is similar to that of FIG. 5. However, the succeeding vehicle S is flashing, as is indicated by two stars at the front of the succeeding vehicle S. Accordingly, the left lane LL is available and is completely free, and the succeeding vehicle S is flashing.

In this "step S13: YES; step S15: YES" situation, the lane change generation unit 140 will, depending on the other parameters of the traffic situation, determine in step S16 whether or not the medium impact threshold time period $t_3$ is lower than or equal to the impact time period $t_0$, and will either generate a lane change request and output this decision to the prior art control system (step S16: YES→step S7), which is indicated in FIG. 11 by an arrow A11a, or suppress the generation of a lane change request and output this decision to the prior art control system (step S16: NO→step S9), which is indicated in FIG. 11 by an arrow A11b.

Figure 12:
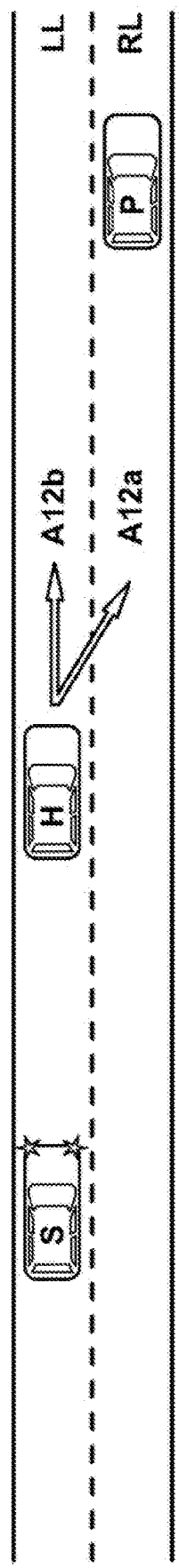

The situation shown in FIG. 12 is similar to that of FIG. 6. However, the succeeding vehicle S is flashing, as is indicated by two stars at the front section of the succeeding vehicle S. Accordingly, a higher-ranking lane is not available, and the succeeding vehicle S is flashing.

In this "step S13: YES; step S15: NO" situation, the lane change generation unit 140 will, depending on the other parameters of the traffic situation, determine in step S17 whether or not the very low impact threshold time period $t_1$ is lower than or equal to the impact time period $t_0$, and will either generate a lane change request and output this decision to the prior art control system (step S17: YES→step S7), which is indicated in FIG. 12 by an arrow A12a, or suppress the generation of a lane change request and output this decision to the prior art control system (step S17: NO→step S9), which is indicated in FIG. 12 by an arrow A12b.

Figure 13:
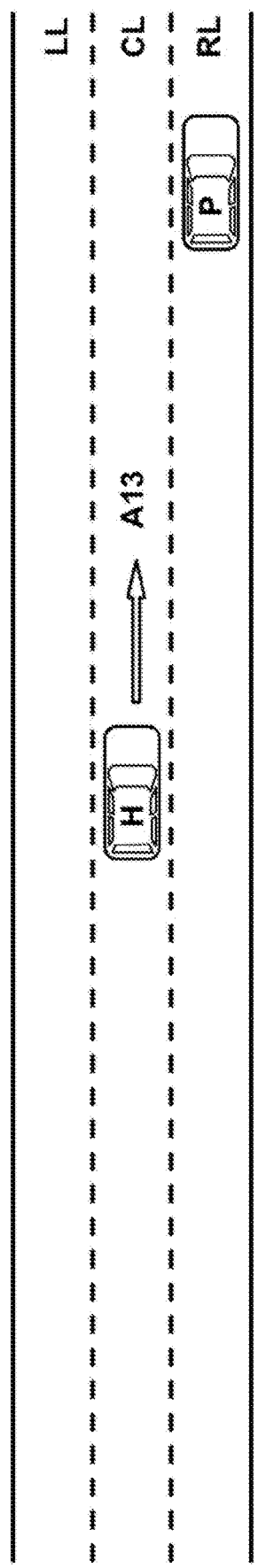

In the situation shown in FIG. 13, there is no succeeding vehicle approaching the host vehicle H from behind. However, there is a preceding vehicle P ahead of the host vehicle H traveling in the right lane RL at a speed slower than that of the host vehicle H. In this "step S6: NO; step S8: NO" situation, the lane change generation unit 140 will suppress a lane change request and output this decision to the prior art control system in step S9, which is indicated in FIG. 13 by an arrow A13.

The invention claimed is:

1. A vehicle control device (100) adapted to be mounted in a host vehicle (H), the vehicle control device (100) comprising:
   an environment monitoring unit (DT) adapted and configured to monitor the environment of the host vehicle (H) and to provide corresponding environment monitoring data, and
   a lane change request generating unit (140) adapted and configured to determine based upon the environment monitoring data whether the generation of a request for a lane change of the host vehicle (H) from said current lane (CL) to said lower-ranking lane (RL) is to be suppressed, if the environment monitoring data indicate that there is a preceding vehicle (P) traveling in a lower-ranking lane ahead of the host vehicle (H) at a speed lower than the speed of the host vehicle (H), and/or whether the generation of a request for a lane change of the host vehicle (H) from a current lane (CL) to a lower-ranking lane (RL) is to be initiated or is to be suppressed, if the environment monitoring data indicate that at least one succeeding vehicle (S) traveling in the same lane as the host vehicle (H) approaches the host vehicle from behind at a speed higher than the speed of the host vehicle (H).

2. The vehicle control device according to claim 1, wherein the speed of the succeeding vehicle (S) is defined to be the highest speed of the succeeding vehicle (S) found in the monitoring history of said succeeding vehicle (S).

3. The vehicle control device according to claim 1, wherein the lane change request generating unit (140) is adapted and configured to suppress the generation of a lane change request, if the environment monitoring data indicate that a speed difference between the nearest succeeding vehicle (S) and the host vehicle (H) is lower than a predetermined speed difference threshold value.

4. The vehicle control device according to claim 1, wherein the lane change request generating unit (140) includes a negative impact estimation sub-unit (142) adapted and configured to estimate the negative impact of a lane change on the host vehicle (H), if the environment monitoring data indicate that a speed difference between the nearest succeeding vehicle (S) and the host vehicle (H) is greater than or equal to a predetermined speed difference threshold value.

5. The vehicle control device according to claim 4, wherein the negative impact estimation sub-unit (142) is adapted and configured to estimate an impact time period ($t_i$) as a parameter representing the negative impact of a lane change on the host vehicle (H), said impact time period ($t_i$) including a basic impact time period ($t_0$) needed by the host vehicle (H) to change to the lower-ranking lane (RL), let the at least one succeeding vehicle (S) pass, and return to the current lane (CL).

6. The vehicle control device according to claim 5, wherein the impact time period ($t_i$) further includes at least one additional impact time period ($t_{decel}$, $t_{low\_speed}$, $t_{\Delta speed}$) corresponding to an additional negative impact resulting from a respective negative impact increasing parameter.

7. The vehicle control device according to claim 4, wherein the lane change request generating unit (140) includes a negative impact threshold value setting sub-unit (144) adapted and configured to set a negative impact threshold value ($t_1$, $t_2$, $t_3$), and
wherein the lane change request generating unit (140) is further adapted and configured to suppress the generation of a lane change request, if the negative impact ($t_i$) estimated by the negative impact estimation sub-unit (142) is greater than the negative impact threshold value ($t_1$, $t_2$, $t_3$) set by the negative impact threshold value setting sub-unit (144).

8. The vehicle control device according to claim 7,
wherein the negative impact threshold value setting sub-unit (144) is adapted and configured to set the negative impact threshold value ($t_1$, $t_2$, $t_3$) based on whether or not the environment monitoring data indicate that a higher-ranking lane (LL) is available and free and/or based on whether or not the environment monitoring data indicate that the nearest succeeding vehicle (S) is flashing.

9. The vehicle control device according to claim 8,
wherein the negative impact threshold value setting sub-unit (144) is adapted and configured to set the negative impact threshold value
to be zero, if the higher-ranking lane (LL) is available and free and the nearest succeeding vehicle (S) is not flashing, and/or
to a very low value ($t_1$), if the higher-ranking lane (LL) is available and free and the nearest succeeding vehicle (S) is flashing, and/or
to a low value ($t_2$), if the higher-ranking lane (LL) is neither available nor free and the nearest succeeding vehicle (S) is not flashing, and/or
to a medium value ($t_3$), if the higher-ranking lane (LL) is neither available nor free and the nearest succeeding vehicle (S) is flashing.

10. The vehicle control device according to claim 9,
wherein the negative impact threshold value setting sub-unit (144) is adapted and configured to estimate a first time period ($t_1$) available to the host vehicle (H) for traveling on the lower-ranking lane (RL) at its current speed without collision with another vehicle also traveling on the lower-ranking lane (RL), and to set the first time period ($t_1$) as the very low negative impact threshold value.

11. The vehicle control device according to claim 9,
wherein the negative impact threshold value setting sub-unit (144) is adapted and configured to estimate a second time period ($t_2$) available to the host vehicle (H) for traveling on the lower-ranking lane (RL) at a predetermined speed without collision with another vehicle also traveling on the lower-ranking lane (RL), said predetermined speed being the current speed minus a predetermined speed difference, and to set the second time period ($t_2$) as the low negative impact threshold value.

12. The vehicle control device according to claim 9,
wherein the negative impact threshold value setting sub-unit (144) is adapted and configured to estimate a third time period ($t_3$) available to the host vehicle (H) for traveling on the lower-ranking lane (RL) at a further predetermined speed without collision with another vehicle also traveling on the lower-ranking lane (RL), said further predetermined speed being the current speed minus a further predetermined speed difference, and to set the third time period ($t_3$) as the medium negative impact threshold value.

13. The vehicle control device according to claim 11, wherein the further predetermined speed difference is double the predetermined speed difference.

14. The vehicle control device according to claim 7, wherein the lane change request generating unit (140) is further adapted and configured to suppress the generation of a lane change request, even if the negative impact ($t_0$) estimated by the negative impact estimation sub-unit (142) is lower than or equal to the negative impact threshold value ($t_1$, $t_2$, $t_3$) set by the negative impact threshold value setting sub-unit (144), if the environment monitoring data indicate that a negative impact increasing parameter exceeds a negative impact increasing parameter threshold value, and to generate a lane change request, if the environment monitoring data indicate that the negative impact increasing parameter doesn't exceed the negative impact increasing parameter threshold value.

15. A vehicle control method comprising
monitoring the environment of a host vehicle (H) and providing corresponding environment monitoring data, and
determining based upon the environment monitoring data whether the generation of a request for a lane change of the host vehicle (H) from said current lane (CL) to said lower-ranking lane (RL) is to be suppressed, if the environment monitoring data indicate that there is a preceding vehicle (P) traveling in a lower-ranking lane ahead of the host vehicle (H) at a speed lower than the speed of the host vehicle (H), and/or whether the generation of a request for a lane change of the host vehicle (H) from a current lane (CL) to a lower-ranking lane (RL) is to be initiated or is to be suppressed, if the environment monitoring data indicate that at least one succeeding vehicle (S) driving in the same lane as the host vehicle (H) approaches the host vehicle from behind at a speed higher than the speed of the host vehicle (H).

16. The vehicle control method according to claim 15,
wherein the speed of the succeeding vehicle (S) is defined to be the highest speed of the succeeding vehicle (S) found in the monitoring history of said succeeding vehicle (S).

17. The vehicle control method according to claim 15, further comprising:
suppressing the generation of a lane change request, if the environment monitoring data indicate that a speed difference between the nearest succeeding vehicle (S) and the host vehicle (H) is lower than a predetermined speed difference threshold value.

18. The vehicle control method according to claim 15, further comprising:
estimating the negative impact of a lane change on the host vehicle (H), if the environment monitoring data indicate that a speed difference between the nearest succeeding vehicle (S) and the host vehicle (H) is greater than or equal to a predetermined speed difference threshold value.

19. The vehicle control method according to claim 18, further comprising:
estimating an impact time period ($t_i$) as a parameter representing the negative impact of a lane change on the host vehicle (H), said impact time period ($t_i$) including at least a basic impact time period ($t_0$) needed by the host vehicle (H) to change to the lower-ranking lane (RL), let the at least one succeeding vehicle (S) pass, and return to the current lane (CL).

20. A computer readable medium having a vehicle control program causing a computer of a vehicle control device (100) to execute the vehicle control method of claim 15.

* * * * *